Figure 4:
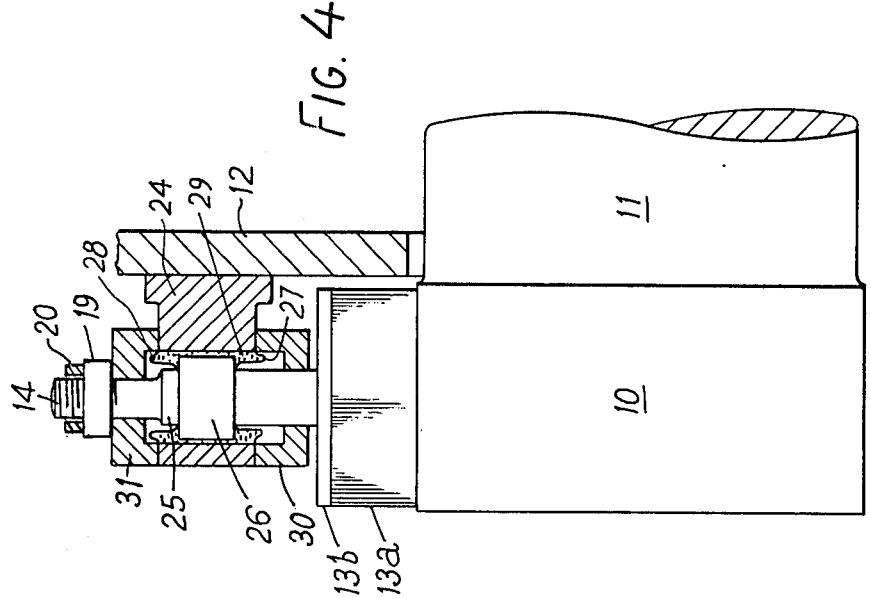

United States Patent [19]

Dobbing et al.

[11] 4,071,795
[45] Jan. 31, 1978

[54] BRUSH GEAR FOR ELECTRICAL MACHINERY

[75] Inventors: Peter Philip Dobbing; Peter William Kendall, both of Newcastle-upon-Tyne, England

[73] Assignee: International Research & Development Company Limited, Newcastle-upon-Tyne, England

[21] Appl. No.: 609,185

[22] Filed: Sept. 2, 1975

[51] Int. Cl.² .................................................. H02K 13/00
[52] U.S. Cl. ...................................... 310/219; 310/243
[58] Field of Search ........ 310/219, 243, 232, 248–251, 310/361, 541, 542

[56] References Cited

U.S. PATENT DOCUMENTS

| 821,197 | 5/1906 | Speirs | 310/243 |
| 884,049 | 4/1908 | Speirs | 310/242 |
| 3,123,731 | 3/1964 | Gordon | 310/243 |
| 3,436,575 | 4/1969 | Harvey | 310/219 |
| 3,517,239 | 6/1970 | Sedlock | 310/243 |
| 3,668,451 | 6/1972 | McNab | 310/251 |
| 3,886,386 | 5/1975 | Hillig | 310/251 |

FOREIGN PATENT DOCUMENTS

| 764,358 | 5/1954 | Germany | 310/243 |
| 505,328 | 12/1954 | Italy | 310/219 |

*Primary Examiner*—R. Skudy

[57] ABSTRACT

Brush gear for electrical machinery comprises a brush movably mounted on a support and a flexible housing which connects the brush with the support and contains a quantity of liquid metal to form a current flow path between the brush and the support. The brush, which is preferably composed of resilient fibres, may be adjustable by a positive drive mechanism, the necessary movement being permitted by bellows walls or diaphragms forming the housing.

7 Claims, 4 Drawing Figures

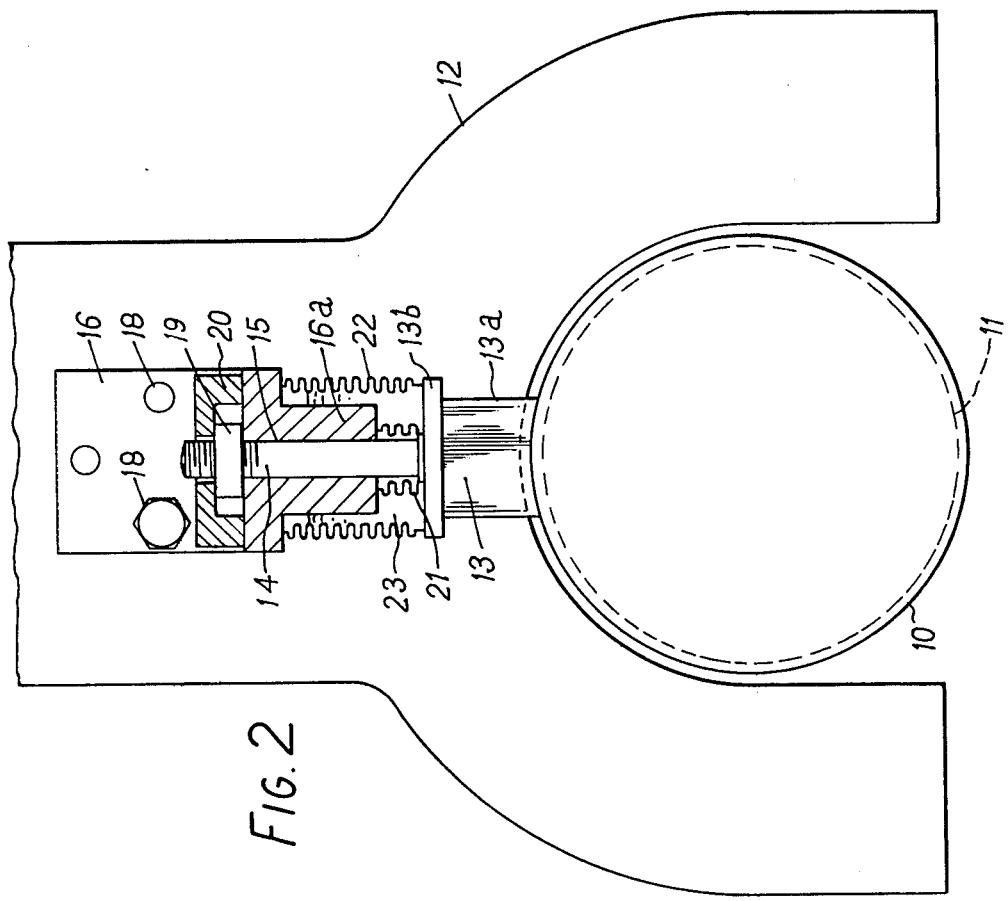
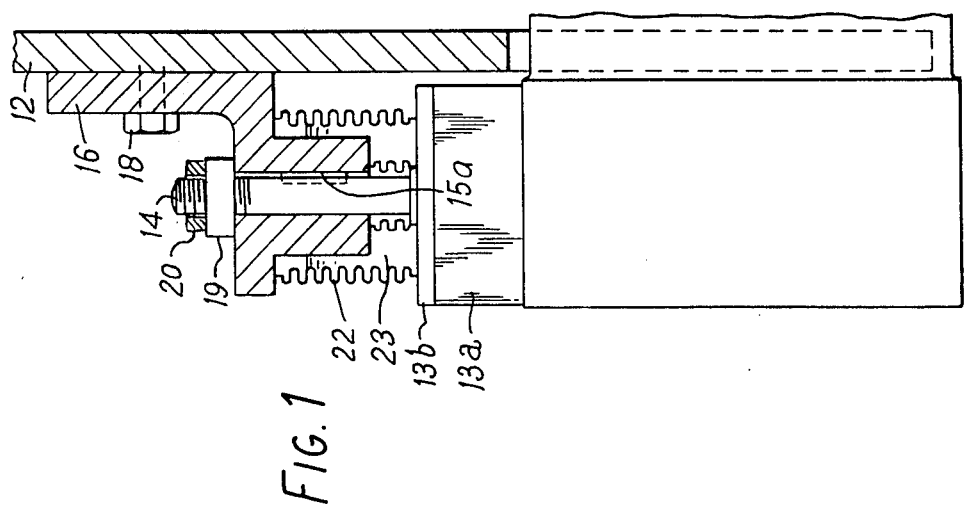

BRUSH GEAR FOR ELECTRICAL MACHINERY

The present invention relates to brush gear for electrical machinery.

In rotary machines such brush gear cooperates with a slip-ring or commutator on the rotor for the transfer of current between the rotor and the stator. Brush gear can also be used on a moving machine part or vehicle for the transfer of current to or from a fixed rail along which the brush gear travels.

In most instances the or each brush of such brush gear is mounted on a support for movement towards and away from a current transfer surface with which it is to cooperate. It is then frequently necessary to provide a flexible electrical connection between the brush itself and the support to ensure electrical continuity while allowing such movement to take place. Conventionally this is effected by means of flexible copper braids. In cases of high current rating the size of these braids is often greater than that of the brush. The size could be reduced if adequate cooling were possible but the structure of such braids does not readily allow the incorporation of a cooling system.

In accordance with the present invention there is provided brush gear for electrical machinery comprising a current transfer brush mounted on a support for movement towards and away from a current transfer surface, a flexible housing sealed to the brush and to the support and a quantity of liquid metal enclosed in the housing and in electrical contact with the brush and with the support for the flow of current therebetween.

In a preferred embodiment the brush is adjustable relative to the support by positive drive means. Preferably the brush is composed of resilient fibres, in the preferred embodiment carbon fibres, and these fibres may have a metallic coating.

The flexible housing may comprise bellows walls, diaphragm seals, or the like, which allow changes in the position of the brush relative to the support whilst continuing to enclose the liquid metal.

The flexible housing may be partially or completely filled with liquid metal. Cooling means may be applied to the flexible housing in order to reduce the temperature of the liquid metal within the housing when the liquid metal is carrying current.

Figure 3:
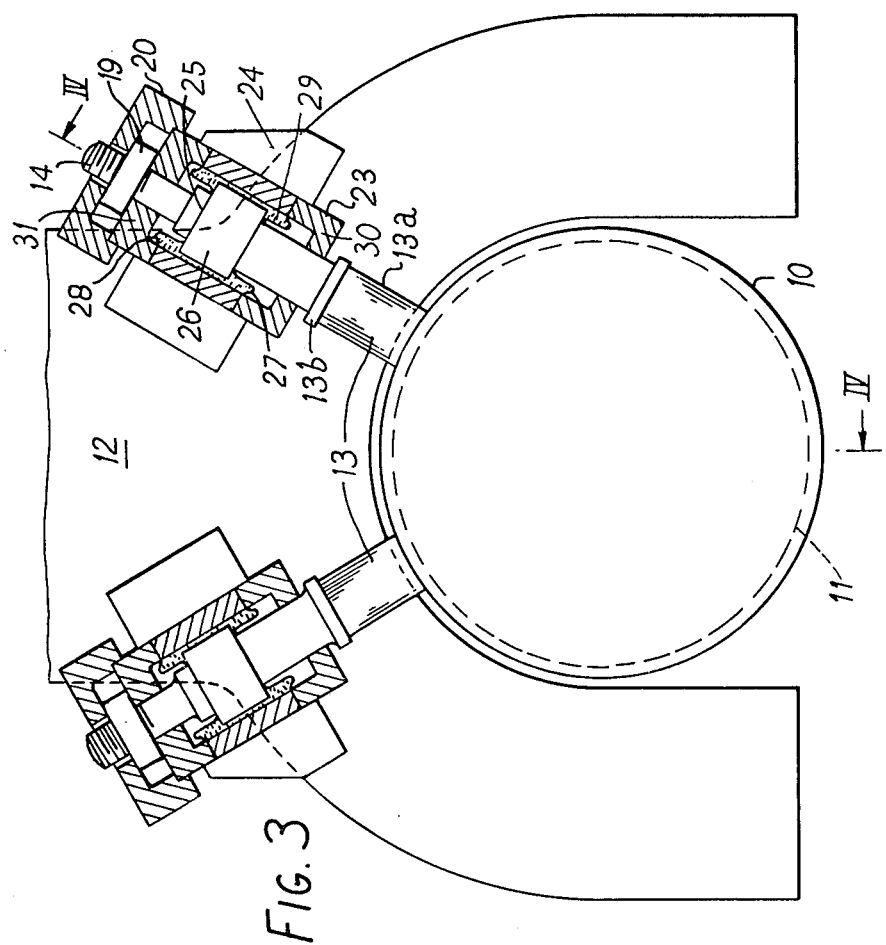

The invention will now be described in more detail with the aid of examples illustrated in the accompanying drawings, in which:

FIG. 1 is a sectional side elevation of one form of brush gear in accordance with the invention together with a cooperating slip-ring of a motor, FIG. 2 is a sectional end elevation of the assembly of FIG. 1, FIG. 3 is a view similar to FIG. 2 of a motor having two sets of brush gear in accordance with a second form of the invention, and FIG. 4 is a sectional side elevation of the assembly of FIG. 3 on the line IV—IV.

In the embodiment of FIGS. 1 and 2 current transfer between a slip-ring 10 mounted on a shaft 11 of an electric motor and a busbar 12 is effected by means of a brush 13 which consists of a multiplicity of resilient conducting fibres 13a held in a brush-holder 13b. The resilient fibre brush 13 may be constructed in accordance with any of our British Patent Specifications Nos. 1,191,234; 1,325,434; and 1,388,123.

A bolt 14 is fixed to the top of the brush-holder 13b. The bolt 14 passes through a clearance bore 15 in a generally L-shaped copper busbar clamp 16 which is fixed to the busbar 12 by screws 18. The bore 15 is provided with a key 15a which engages in a slot in the bolt 14 and prevents rotation of the bolt 14 and the brush 13 while permitting movement of the brush rectilinearly relative to the slip ring. At the top end of the bolt 14 there is provided an adjusting nut 19 which is disposed within a fixed housing 20 and which engages a threaded portion of the bolt 14 and the underside of the housing 20 which provides positive drive means for moving the brush rectilinearly relative to the slip ring.

An inner flexible bellows 21 and an outer flexible bellows 22 are fixed in a liquid-tight manner, for example by welding, to the top face of the brush-holder 13b and the bottom face of the clamp 16 and within the flexible container so formed is contained a quantity of liquid metal 23. The clamp 16 has a circular spigot portion 16a which projects downwards from the clamp 16 and is in contact with the quantity of liquid metal 23.

In operation the current collection brush fibres are maintained in good electrical contact with the slip-ring by means of the adjusting nut 19 and current from the brush is carried by the liquid metal contained within the bellows. The spigot portion 16a is arranged to always be in contact with the liquid metal up to the maximum extension of the brush, whose position may be adjusted as wear occurs in the brush fibres. The current is thus transferred via the spigot portion 16a to the clamp 16 and hence to the busbar 12.

In the embodiment shown in FIGS. 3 and 4 there are two identical sets of brush gear. Each set has a busbar clamp 24 comprising a generally cylindrical member having flanges for fixing to the busbar 12. The bolt 14 is fixed to the top of the brush-holder 13b as before, but has an increased diameter region 25 and a collar 26. In this embodiment two diaphragm seals 27 and 28 are used to contain the liquid metal 29 which completely fills the flexible container thus formed.

The inner edges of the diaphragm seals 27 and 28 are attached to opposite ends of the collar 26 of the bolt 14. The outer edges of the seals 27 and 28 are clamped between the ends of the cylindrical part of the clamp 24 and two end caps 30 and 31. The bolt 14 passes freely through bores in the end caps 30 and 31. As before the brush 13 is positively adjustable by the nut 19 acting against the fixed frame 20 to maintain the fibres 13a in contact with the slip-ring.

Cooling means, not shown, can readily be applied to the brush gear described in order to reduce the temperature of the liquid metal. Such cooling means may be in the form of a heat pipe of which one end is in contact with the liquid metal and the other end with a heat sink. Alternatively a cooling coil for the circulation of a liquid coolant such as water may be mounted on or within the flexible housing.

Instead of the simple manually-adjustable positive displacement adjusting means for the brush gear which is formed by the nut 19 in the embodiments described, it is possible to use other adjusting means as described in our British Patent Specification No. 1,396,309. For example, a servomechanism may be employed to adjust the contact pressure of one or more brushes automatically in response to measurements of parameters related to contact pressure.

Brush gear in accordance with the invention is not confined to use in rotary electrical machines. It may also be applied for current transfer between any relatively-moving bodies.

We claim:

1. Brush gear for electrical machinery comprising a current transfer brush composed for resilient fibres, a support for said brush, means mounting said brush on said support for movement towards and away from a current transfer surface, positive drive adjusting means for effecting said movement of the brush relative to the support, a flexible housing sealed to the brush and the support and a quantity of liquid metal enclosed in said housing, said housing permitting said movement of said brush relative to said support and said liquid metal being in electrical contact with the brush and with the support throughout said movement for the flow of current between the brush and the support.

2. Brush gear as claimed in claim 1 in which the resilient fibres have a metallic coating.

3. Brush gear as claimed in claim 1 in which the flexible housing is formed by two coaxial bellows walls.

4. Brush gear as claimed in claim 5 in which the bellows walls surround an adjusting bolt fixed to the brush.

5. A brush gear for electrical machinery comprising a current transfer brush comprised of resilient fibers, a support for said brush, electrically conductive means mounting the brush on the support for movement toward and away from a current transfer surface, positive drive adjusting means for effecting movement of said electrically conductive means and, hence, of the brush relative to the support and a flexible housing sealed to the electrically conductive means and the support and a quantity of liquid metal enclosed in said housing, said housing permitting said movement of the electrically conductive means and, hence, of said brush relative to said support and said liquid metal being in electrical contact with said electrically conductive means and, hence, with the brush and with the support throughout said movement for the flow of current between the brush and the support.

6. Brush gear according to claim 5 wherein said flexible housing comprises a pair of flexible diaphragms attached at their outer edges to the support and at their inner edges to said electrically conductive means mounting the brush on the support.

7. Brush gear according to claim 6 in which said electrically conductive means mounting the brush on the support is a bolt to one end of which the brush is fixed and to the other end of which is threaded a nut by means of which the bolt and, hence, the brush is adjustable and wherein said bolt extends coaxially through a cylindrical cavity in the support and the space enclosed by the diaphragm is completely filled with liquid metal.

* * * * *